Feb. 13, 1940.   R. J. BEITEL, JR   2,190,008
CHROMATIC TEST TARGET
Filed March 29, 1937
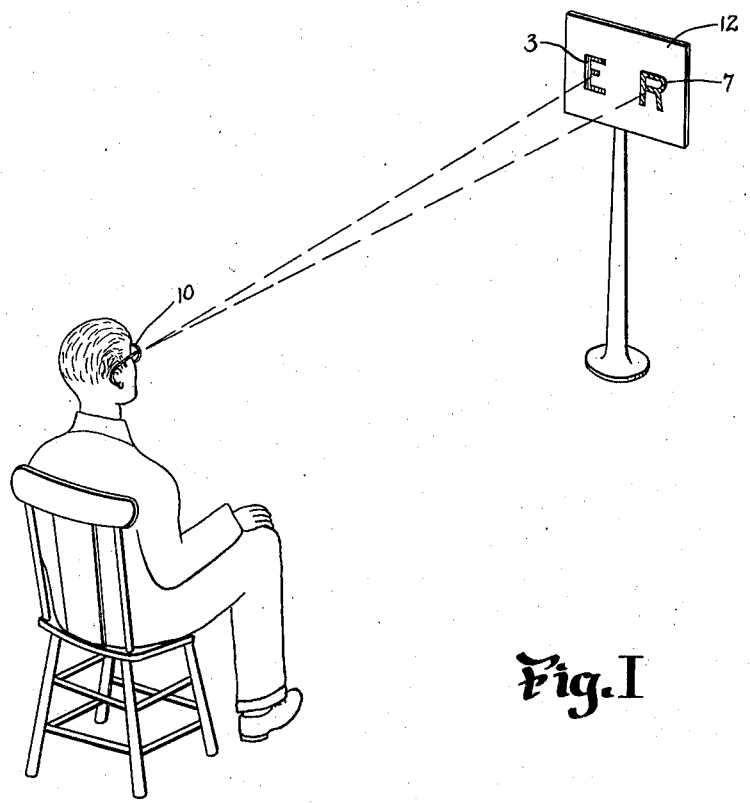
Fig. I
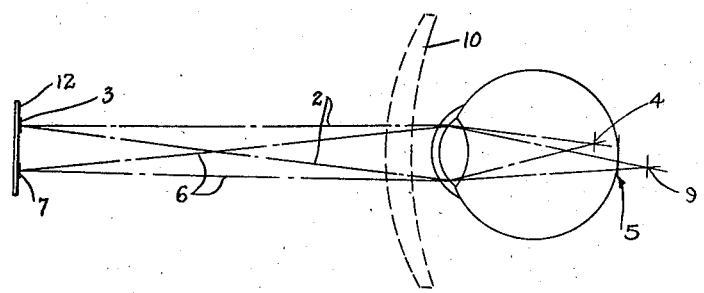
Fig. II
INVENTOR
ROBERT J. BEITEL JR
BY
Harry H. Styll
ATTORNEY Patented Feb. 13, 1940

2,190,008

UNITED STATES PATENT OFFICE 2,190,008

CHROMATIC TEST TARGET

Robert J. Beitel, Jr., Southbridge, Mass., assignor to American Optical Company, Southbridge, Mass., a voluntary association of Massachusetts Application March 29, 1937, Serial No. 133,616

2 Claims. (Cl. 88—20)

This invention relates to tests employed in connection with the examination of a patient's eyes to determine the correct prescription for ophthalmic lenses required for the patient's correct vision. The present invention relates more particularly to a test known as the "bichrome test".

An object of the present invention is to render the testing of the patient's eyes more effective and more accurate.

In the accompanying drawing which illustrates my invention;

Fig. I illustrates in perspective a test in which a display comprising indicia is exhibited to the patient; and Fig. II is a diagrammatic view illustrating the reaction of the eye to different colors.

The chromatic test as at present used affords sufficient examination to permit the examiner to approximately determine the correction required for one or both eyes of the patient. By means of test lenses, the vision of the patient is approximately corrected in accordance with this examination and test characters are exhibited to the patient to determine the correctness of compensation brought about by the test lenses. In giving the chromatic test according to present practice, the characters which the patient views are black and part of the background is red and the other part is green.

This is based upon the characteristic of the human eye known as chromatic aberration. The chromatic test, otherwise known as the bichrome test, takes advantage of the different focal planes of the different colors which result from the chromatic aberration. The test depends, for accurate results, upon determination by the patient of the relative sharpness of the black characters upon the red and green backgrounds. I have discovered that the nature of the background is a factor in the excellence of the comparison.

In accordance with my invention I improve the accuracy of such testing of the eyes by exhibiting to the patient colored indicia on a substantially uniform background. If the test is the above mentioned chromatic or bichrome test, I employ red and green characters on such a background. According to one embodiment of my invention, I employ red and green characters on an achromatic background, such as a neutral grey background. According to another embodiment of my invention, I employ red and green characters on a yellow background.

As illustrated in Fig. II, under normal conditions the yellow portion of the spectrum is sharply focused in the plane of the retina, while the green portion of the spectrum is sharply focused in a plane in front of the retina and the red is sharply focused in a plane in the rear of the retina, the focal planes of the red and green being substantially equidistant from the retinal plane.

In Fig. II it will be noted that the light rays 2 coming from the green test character 3 will be focused at 4 in front of the plane of the retinal screen 5 and that the light rays 6 coming from the red test character 7 will be focused at 9 in the rear of the plane of the retinal screen. The test lens 10 is illustrated by the dash lines.

To check the accuracy of the prescriptive lenses before the eyes a test chart 12 having red and green test characters 7 and 3 respectively thereon is exposed to the vision of the patient (see Fig. I). The patient is asked to state which of the two test characters appears sharper. Should he report that the red test character is the sharper, the examiner immediately knows that the eyes are slightly over corrected. While on the other hand, if he states that the green is the sharper the examiner immediately knows that the patient is slightly under corrected. The chromatic or bichrome test can be used, therefore, as a final check in determining accurately the prescription for corrective ophthalmic lenses.

The characters can be exhibited in any suitable manner. For instance, I may use a chart 12 whose characters appear on a neutral grey background. Thus the green characters 3 are printed or in other manner formed on the neutral grey background on one side of the chart and red characters 7 are formed on the same background on the other side of the chart. Instead of such a chart, I may employ a screen and by means of a projector, throw the desired characters together with a neutral grey background upon the screen. If the screen itself constitutes a neutral grey background, the colored characters may be thrown on the screen which thus provides a uniform background for these characters.

Instead of an achromatic background, I may display the red and green characters on a monochromatic yellow background, preferably a monochromatic yellow approximating the maximum of the visibility function of the eye with respect to wave length. This maximum is about at the sodium line in the spectrum; and corresponds to the wave length of light used to compute indices of refraction of lens glass and for making other optical calculations, and is therefore an advantageous wave length to use in causing the eye to focus.

To further increase the accuracy of the test the shades or tones of the red and green test characters and background may be so controlled and illuminated that the two characters and backgrounds will be of substantially equal intensities so that there will be greater ease in comparison on the part of the patient.

From the above it, therefore, will be seen that the procedure is substantially as follows: The patient is first tested in the usual manner by displaying suitable test charts within his field of vision and by placing corrective test lenses before his eyes which are varied in power until the patient reports clear vision of the test characters. When the best correction has been found in this manner, a chart or other arrangement for displaying colored test characters is placed within the field of vision of the patient. One eye is occluded and the patient is then asked which of the two colors, namely, the red or the green characters, appears the sharpest and clearest. Should the patient report that one of the colors is more distinct than the other, the power of the corrective lens or lenses before the eye under test is slightly increased or decreased according to the patient's report until the test characters are reported as being equally clear and distinct. The same procedure is followed for the other eye. Due to the fact that the screen carrying the colored test characters has a uniform background and that this uniformity equates the backgrounds for the red and for the green test characters, a more accurate test of this nature may be obtained than has been usual in the past.

It will be apparent from the above discussion of my invention that I have changed the stimulation of the eye in such test by making the characters of a color rather than making them black, i. e. absence of color. In the chromatic or bichrome test as at present practiced, the eye attempts to make a sharp focus of the boundaries of the characters which are black. If the red or green background is in focus, the contrast of black to red or green along the edge of the character is sharp, and a clear impression of the character is made on the eye.

In accordance with my invention, the eye focuses to a large extent on the red or green characters themselves to the exclusion of the background. This is what the test aims to accomplish, since it is the difference in the focal planes of the different colors which are relied upon to give an accurate test. In accordance with my invention, the background for the red character is the same as the background for the green character; hence, the uniform background balances in the cases of the red and of the green letters, and if this background gives some slight stimulation to the retina along borders of the red character or indicia, the same stimulation is given to the retina along the edges of the green character or indicia. As nearly as possible, therefore, I limit the test to the difference between stimulation of the eye by red characters and stimulation of the eye by green characters in the chromatic or bichrome test.

It will be understood that while I have illustrated and described a specific manner of practicing my invention, the principles may be otherwise embodied and practiced within the scope of the following claims.

I claim:

1. In a device of the character described for testing the visual acuity of an eye, a test chart having a background of a color which is of uniform intensity and wavelength frequency composition throughout its area and which is essentially of the color having the wavelength frequency of that portion of the visible spectrum which approximates the maximum of the visibility function of a normal eye, and stimulus objects of different color wavelength frequency compositions which are different from that of the background by substantially equal amounts, said stimulus objects being of distinguishable color sensation and of such frequencies that one is less and the other greater than the frequency of the background, said background and test characters being of such a nature as to cooperate with each other to afford equal stimulation of the retina of the eye under test by each of said test characters so as to take advantage of the chromatic aberration of the eye as a means of determining the clarity and definition of said test characters relative to each other.

2. In a device of the character described for testing the visual acuity of an eye, a test chart having a yellow background which is of uniform intensity and wave length frequency composition throughout its area to form a background having the color frequency of that portion of the visible spectrum which approximates the maximum of the visibility function of a normal eye, and stimulus objects of different color wavelength frequency compositions, one of which is red and the other green normally different from the yellow by similar amounts whereby, in a normal eye, the yellow will focus in the plane of the retina of the eye and the red and green objects will be off focus similar amounts, one in front of the retina of the eye and the other in the rear of the retina of the eye with the intensity of said objects providing equal stimulation of the retina of the eye under test so as to take advantage of the chromatic aberration of the eye as a means of determining the clarity and definition of said test characters relative to each other.

ROBERT J. BEITEL, Jr.